April 21, 1970   F. KNIESE   3,507,407
DEVICE FOR CONVEYING GOODS TO AND FROM A VACUUM
CONTAINER OR A PRESSURE CONTAINER
Filed March 21, 1968                              2 Sheets-Sheet 1

INVENTOR:
Fritz Kniese,
BY Singer, Stern & Carlberg
Attorneys.

United States Patent Office 3,507,407
Patented Apr. 21, 1970

3,507,407
DEVICE FOR CONVEYING GOODS TO AND FROM A VACUUM CONTAINER OR A PRESSURE CONTAINER
Fritz Kniese, Marburg, an der Lahn-Marbach, Germany, assignor to Industrie-Werke Karlsruhe Aktiengesellschaft, Karlsruhe, Germany, a corporation of Germany
Filed Mar. 21, 1968, Ser. No. 714,893
Claims priority, application Germany, Mar. 25, 1967, J 33,303
Int. Cl. B65g 65/30
U.S. Cl. 214—17                           14 Claims

ABSTRACT OF THE DISCLOSURE

A device for conveying goods to and from the interior of a treatment container comprising a vertically arranged endless conveyor chain having thereon uniformly spaced pistons on which the goods are deposited and moving through a vertically arranged guide tube the inner wall of which is sealingly engaged by the pistons. The principal feature of the invention consists in this that the guide tubes—there is one provided for each straight portion of the conveyor chain—are made of an expansible material, such as silicone rubber, and that the diameter of the pistons is larger than the inner diameter of the guide pipes by an amount which is less than the radial expansivity of the guide pipes.

---

The invention relates to a device for conveying goods, preferably granular goods, to and from the interior of a vacuum container or a pressure container, particularly a freeze drier, by means of a continuous endless conveyor chain or the like, which is provided with preferably equidistantly arranged pistons. This conveyor chain is guided over two vertically spaced sprocket wheels, one each inside and outside of the container, and in the region of its straight strand is guided through vertical channel-type guide pipes which are evacuable and pressureable and extend into the interior of the container and whose length is in excess of the distance between two successive pistons. The pistons of the guide chain when passing through the guide pipes sealingly engage the inner surface of the pipe walls whereby a transportation chamber is formed between each two successive pistons.

In devices of the type mentioned the pistons of the conveyor chain have to be fitted into the guide pipes for the purpose of maintaining a satisfactory sealing engagement with an extremely small tolerance. This increases the production costs. Since the sealing between piston and pipe wall is in time subject to wear, the pairing of suitable wear-resistant materials for pistons and guide pipe poses considerable difficulties. This problem is compounded when the device is to be used within a wide temperature range since the materials selected for reasons of their low wear differ greatly in their coefficients of thermal expansion.

The object of the present invention is to create a device of the above mentioned type in which within liberal temperature limits a satisfactory sealing between piston and pipe wall during the passage of the pistons of the conveyor chain is assured, on the one hand, and the wear is kept low during continuous operation, on the other hand.

This object is achieved in that the guide pipes are made of an expansible material, for example silicone rubber, and that the diameter of the pistons of the conveyor chain is greater than the inner diameter of the guide pipe by an amount which is smaller than the radial expansivity of the guide pipes, so that the pistons during their passage through the guide pipe radially expand the same and an area pressure between piston and pipe wall becomes effective which insures tight sealing.

The pistons of the conveyor chain may, per se, be made of any kind of material as long as it has sufficient strength properties, particularly with respect to abrasion. According to the invention, however, the pistons of the conveyor chain are made of a material, for example, Teflon, whose coefficient of thermal expansion is approximately equal to that of the material used for the guide pipe. This assures within a wide temperature range an approximately uniform area pressure between piston and pipe wall during the passage of the pistons through the guide pipe. Particularly advantageous has proven to be the pairing of Teflon for the pistons with silicone rubber for the guide pipes, as this combination of materials leads to a continuous self-cleaning of the device.

In a further embodiment of the invention the guide pipe may be kept under pre-tension in axial direction throughout the desired temperature range. For this purpose the invention proposes to arrange a support at each end of the guide pipe which support extends over the front end face of the guide pipe and the supports at both pipe ends are closely connected with each other by means adapted to accommodate tension forces. Each support may have an exterior and an interior flange and these flanges extend in axial direction of the guide pipe and form an annular space into which is inserted the associated front end of the guide pipe, whereby the inner diameter of the interior annular flange is larger than the inner diameter of the guide pipe and the guide pipe is provided with a corresponding recess which is engaged by the interior annular flange.

The supports may be connected to each other by means of a steadying tube serving as an anchoring member which concentrically encloses the guide pipe substantially over its entire length. It was found to be advantageous to arrange an annular gap between the outer side of the wall of the guide pipe and the inner wall of the supporting tube serving as an anchoring member, into which gap those sections of the guide pipe may be deflected which are radially expanded during the passage of a piston of the conveyor chain.

According to another feature of the invention, the guide pipe may consist of at least two separate axial portions which are connected with each other by means of a pipe coupling. The pipe coupling may be provided with an intermediate ring which overlaps the front ends of the two adjacent portions of the guide pipe and is threadedly connected to the associated supporting tubes which serve as anchoring members.

The intermediate ring serving as a pipe coupling may, according to another feature of the invention, be provided with an annular groove on its inner side between the sections for receiving the front ends of the separate guide pipe portions, whereby said annular groove has an inclined face arranged at the exit side of the pistons of the conveyor chain and extending from the groove base inwardly in the direction of conveyance.

It has been found particularly advantageous to arrange the outlet for a pressure or an evacuation pipeline on the intermediate ring of the pipe coupling and to provide at least one channel which is in communication with such pipeline and which in the region of the groove base projects through the intermediate ring, thus establishing a connection between pipeline and guide pipe interior. In order to achieve a satisfactory evacuation of or a pressure charge on the interior of the guide pipe, a plurality of such channels is required as a rule.

If such a conveyor chain (hydraulic elevator) is used for feeding granular goods to a vacuum container and the chambers formed between two successive pistons are evacuated during the passage of the pistons through the guide pipe, there is always the danger that at the connecting points of the vacuum pipes some of the conveyed material is taken along by suction. This danger is met according to the invention in that the intermediate ring is provided with a cylindrical section which, when viewed in the direction of movement of the conveyor chain, is located in front of the annular groove and has an inner radius which is greater than the piston radius by an amount that corresponds to the average particle size of the material conveyed. Thereby the evacuation of the transportation chamber located behind the piston moving into the region of the pipe coupling is effected before the piston enters the region of the annular groove. The small annular gap between the outer surface of the piston and the cylindrical section of the intermediate ring may, if any, permit only minute particles of the conveyed material to pass through. However, also these particles are not diverted into the vacuum pipe, but instead they fall downward by gravity and their own inertia in the region of the annular groove of the intermediate ring and slide off at the lower inclined surface of the side wall of the annular groove to pass into the transportation chamber lying below the annular groove since because of the large cross sections in the region of the annular chamber only very small velocities of flow occur during the evacuation process.

An improvement of the suction conditions may accordingly to the invention also be achieved by the provision of an outer ring which concentrically encloses the intermediate ring and forms a chamber which is sealed with respect to the intermediate ring and which receives the end of the channel or channels passing through the intermediate ring and the pipeline connection. This outer ring is threadedly attached to the supporting tubes serving as anchoring members and is sealed with respect to these tubes. The guide pipes are, of course, sealingly connected with the associated supports to withstand a high vacuum, or the separate portions of the guide pipe are connected in the same manner with the pipe coupling, respectively. A particular advantage of the arrangement according to the invention resides in the low friction of the pistons of the conveyor chain during their passage through the guide pipes.

The device according to the invention may instead of granular goods also convey other materials, such as ampules or the like in their proper position, to a vacuum container or a pressure container.

These and other objects of the invention will now be described with reference to the accompanying drawings which illustrate several exemplary embodiments of the device according to the invention without limiting the invention to these illustrated embodiments.

Figure 1:
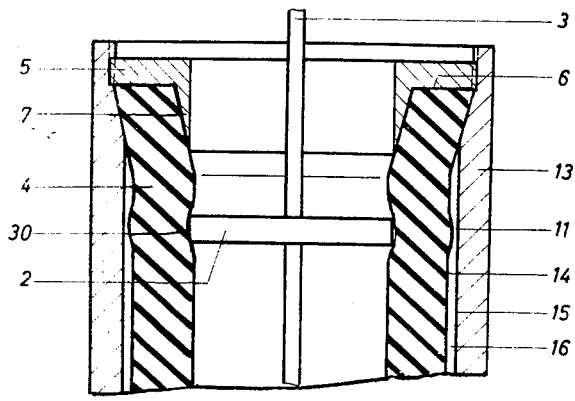
FIG. 1 is a partial view of a guide pipe including support and transportation means, partly in section.

Referring to FIG. 1, preferably granular goods are to be conveyed into respectively out of the interior of a vacuum container or a pressure container 1, particularly a freeze drier, such as is disclosed by way of example in applicant's copending patent application Ser. No. 610,546, filed Jan. 20, 1967. The conveyor includes pistons 2 which are attached at preferably uniform distances from each other to an endless conveyor chain 3 guided over vertically spaced sprocket wheels not illustrated. The pistons pass on their way to and from the interior of the vacuum or pressure container 1 through vertically disposed guide pipes 4 which are made of an expansible material, for example of silicone rubber. In order to ensure a satisfactory sealing between the pistons and the pipe wall during the passage of the pistons 2 through the guide pipe 4, the diameter of the pistons 2 is made larger than the inner diameter of the pipe by an amount which is less than the radial expansivity of the guide pipes. In this manner the pistons 2 when passing through the guide pipes 4 expand the latter radially, as is illustrated at 30, so that an effective sealing between the pistons and the inner surface of the pipe wall takes place. Preferably, the pistons 2 of the conveyor chain 3 are made of a material, for example Teflon, whose coefficient of thermal expansion is approximately equal to that of the material used for the guide pipes 4 so that an approximately uniform area pressure between the pistons and the inner surface of the pipe wall is assured during the passage of the pistons through the guide pipes.

Figure 2:
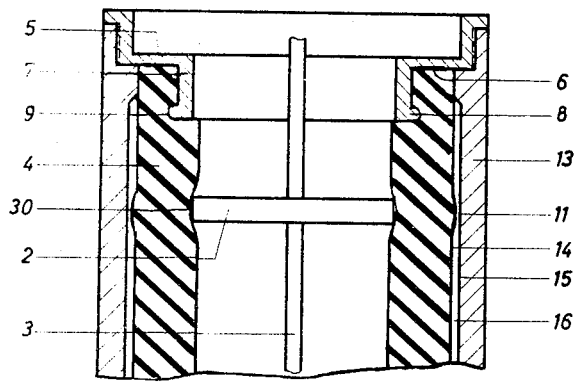
FIG. 2 illustrates a modification of the embodiment shown in FIG. 1.
Figure 3:
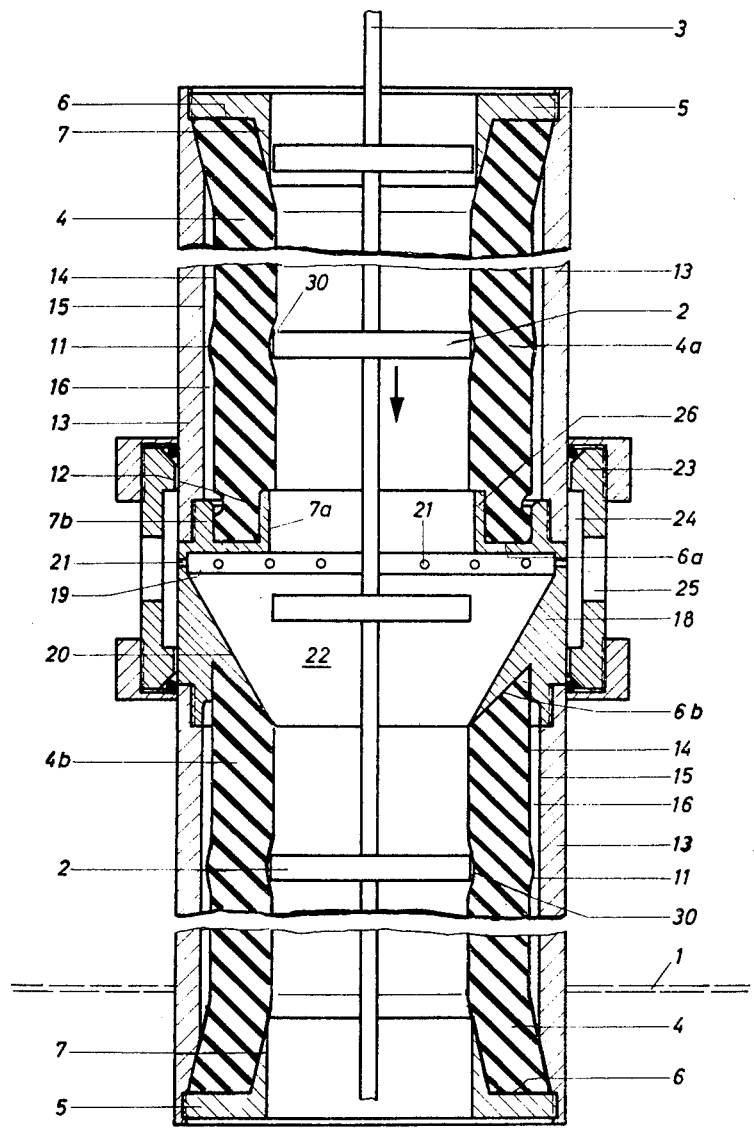
FIG. 3 illustrates a guide pipe composed of two separate portions, including a part of the conveyor device, partly in section.

For fastening the guide pipe 4 serves an annular support 5 inserted into each end of the guide pipe. The support 5 has an outwardly extending flange 5a which overlaps the end faces 6 of the guide pipe. The support 5 is also provided with an axially extending flange 7 projecting in axial direction into the guide pipe 4. In the embodiment according to FIG. 2 this flange 7 is provided at its end with a bead 8 which engages a corresponding annular recess 9 in the guide pipe 4 and thus holds the guide pipe 4 securely. It is also possible to provide the annular support 5 with an inner cylindrical flange 7a and an outer cylindrical flange 7b (FIG. 3), which flanges extend axially with respect to the guide pipe 4 and form an annular groove into which the end 6 of the guide pipe is inserted. This is illustrated in FIG. 3 in conjunction with an intermediate ring 18 which will be described in more detail hereinafter. The guide pipe 4 is provided with a corresponding cylindrical recess 12 which is engaged by the inner cylindrical flange 7a. The supports 5 arranged at the ends of the guide pipes 4 are connected to each other by means of a supporting tube 13 serving as an anchoring member which concentrically surrounds the guide pipe 4 over its entire length. An annular space 16 is provided between the outer wall 14 of the guide pipe 4 and the inner wall 15 of the supporting tube 13 for the purpose of receiving those portions 11 of the guide pipe 4 which are radially expanded during the passage of a piston 2 on the conveyor chain 3 through the guide pipe 4.

The embodiment of the guide pipe 4 illustrated in FIG. 3 comprises at least two separate axially aligned portions 4a and 4b connected with each other by a pipe coupling 18. The pipe coupling 18 is in the form of an intermediate ring which overlaps the adjacent end faces 6a and 6b of the portions 4a and 4b of the guide pipe and is connected with the adjacent ends of the supporting tube 13, for instance by a screw thread.

The intermediate ring 18 is provided on its inner wall between the portions which receive the ends 6a and 6b of the guide pipe portions 4a and 4b, with an annular groove 19 from which extends an inclined surface 20 inwardly from the bottom of the groove 19 toward the conveyor, when viewed in the direction of movement of the conveyor chain 3. Furthermore, radial channels 21 extend outwardly from the bottom of the groove 19 of the intermediate ring 18, which channels serve as communication ducts leading to a pressure pipeline or to a vacuum pipeline and establish a communication between the interior 22 of the guide pipe 4 and the not illustrated pipelines.

The intermediate ring 18 is concentrically surrounded by an outer ring 23 which forms with the intermediate ring 18 and adjacent portions of the supporting tube 13 an annular chamber which is sealed with respect to the ring 18 and with which the channels 21 passing through the intermediate ring 18 are in communication as well as with a pipeline connection aperture 25. This outer ring 23 is connected to the supporting tube 13 serving as an anchoring member, for instance by a screw threaded connection, and is sealed with respect to this tube 13.

Since the intermediate ring 18 serving as a pipe coupling is usually made of a material that has a different coefficient of thermal expansion than the expansible material used for the guide pipe 4, those portions of the ring 18 which overlap the end faces 6a and 6b of the separate guide pipe portions 4a and 4b are larger in cross-section than the inner diameter of the guide pipe portions 4a and 4b. This has the result that the intermediate ring 18, when viewed in the direction of movement of the conveyor chain 3, has a cylindrical section 26 which is located in front of the annular groove 19 and has an inner radius somewhat larger than the radius of the pistons.

The conveyor chain is in known manner moved continuously in one direction but, obviously, may also be adjusted to a periodic operation when used for conveying ampules or the like into and from the vacuum container or pressure container.

What I claim is:

1. In a device for conveying goods to and from the interior of a treatment container, particularly a freeze drier, and endless conveyor chain, a plurality of pistons arranged in spaced relationship on said conveyor chain, and guide pipes of expansible material through which said conveyor chain with said pistons thereon is moved, said guide pipes extending into the interior of said container and their length being in excess of the distance between two successive pistons, said pistons during their passage through said guide pipes sealingly engage the inner surface of said guide pipes and expand the same so that a transportation chamber is formed between each two successive pistons, said guide pipes of expansible material having an inner diameter which is smaller than the diameter of said pistons by an amount which is less than the radial expansivity of said guide pipes, means for keeping said guide pipe in axial direction under pretension within the entire effective temperature range, said means including an annular support arranged at each end of said guide pipe and provided with flange means overlapping the end faces of said guide pipe, and anchoring means connecting the supports at the pipe ends with each other.

2. In a device according to claim 1, in which said pistons of said conveyor chain are made of a material, the coefficient of thermal expansion of which is approximately equal to that of the pipe material.

3. In a device according to claim 1, in which each support is provided with an outer and an inner cylindrical flange extending in axial direction of said guide pipe and forming an annular chamber into which is inserted the associated end of said guide pipe, the inner diameter of said inner cylindrical flange being larger than the inner diameter of said guide pipe, said guide pipe being provided with a cylindrical recess which is engaged by said inner cylindrical flange.

4. In a device according to claim 1, including a supporting tube to which said supports are threadedly connected, said supporting tube serving as an anchoring member which concentrically surrounds said guide pipe substantially over its entire length and subjects the same to tensional stress.

5. In a device according to claim 4, in which an annular space is provided between the outer wall of said guide pipe and the inner wall of said supporting tube to permit an expansion of said guide pipe.

6. In a device according to claim 4, in which said expansible guide pipe is composed of at least two separate axially aligned portions, and means forming a pipe coupling for connecting said portions with each other.

7. In a device according to claim 4, in which said guide pipe is composed of at least two separate axially aligned portions, and means forming a pipe coupling which connects said portions with each other, said means forming said pipe coupling including an intermediate ring which overlaps the front ends of the two adjacent guide pipe portions facing each other and which is threadedly connected with associated supporting tubes serving as anchoring means.

8. In a device according to claim 7, in which said intermediate ring is provided on its inner surface with an annular groove.

9. In a device according to claim 7, in which said intermediate ring is provided on its inner surface with an annular groove, said annular groove being positioned on the outlet side of said pistons of said conveyor chain and having an inclined surface extending from the bottom inwardly and toward the direction of conveyance.

10. In a device according to claim 7, in which said intermediate ring is provided on its inner surface with an annular groove, said intermediate ring having at least one means forming a pipe connection for a pipeline, said pipe connection being in communication with the interior of said guide pipe.

11. In a device according to claim 9, in which said pipe connection is in communication with the interior of sad guide pipe by means of at least one channel passing through said intermediate ring in the region of the bottom of said groove.

12. In a device according to claim 7, in which said intermediate ring is provided on its inner surface with an annular groove and in the direction of movement of said conveyor chain is provided with a cylindrical section located in front of said annular groove and having an inner radius which is larger than the radius of the pistons by an amount which is less than the average particle size of the material conveyed.

13. In a device according to claim 7, in which said intermediate ring is provided on its inner surface with an annular groove and is concentrically surrounled by an outer ring which forms a chamber sealed with respect to said intermediate ring and adapted to receive a channel and a pipeline connection passing through said intermediate ring.

14. In a device according to claim 7, in which said intermediate ring is provided on its inner surface with an annular groove and is concentrically surrounled by an outer ring which forms a chamber sealed wtih respect to said intermediate ring and adapted to receive a channel and a pipeline connection passing through said intermediate ring, said outer ring being threadedly connected to said supporting tubes serving as anchoring means and being sealed tight with respect to said supporting tubes.

References Cited

UNITED STATES PATENTS

| 2,556,183 | 6/1951 | Hapman | 214—17 X |
| 2,564,599 | 8/1951 | Hapman | 198—168 |
| 2,624,474 | 1/1953 | Hapman | 214—17 |
| 3,265,192 | 8/1966 | Stadelman | 198—204 |

HUGO O. SCHULZ, Primary Examiner

U.S. Cl. X.R.

198—176